United States Patent [19]

Chen

[11] Patent Number: 4,468,342

[45] Date of Patent: Aug. 28, 1984

[54] BLENDS OF SURFACTANT HOMOLOGUES ADJUSTED TO SALINITY DURING WATERFLOODING

[75] Inventor: Catherine S. H. Chen, Berkeley Heights, N.J.

[73] Assignee: Mobil Oil Corporation, New York, N.Y.

[21] Appl. No.: 310,545

[22] Filed: Oct. 13, 1981

[51] Int. Cl.³ .............................................. B01F 17/02
[52] U.S. Cl. .................................... 252/353; 166/275;
252/8.55 D
[58] Field of Search .......... 252/353, 549, 554, 8.55 D;
166/275

[56] References Cited

U.S. PATENT DOCUMENTS

| | | | |
|---|---|---|---|
| 2,342,562 | 2/1944 | Tucker | 252/353 |
| 3,827,497 | 8/1974 | Dycus et al. | 252/8.55 D |
| 3,856,738 | 12/1974 | Bodesheim et al. | 260/513 R |
| 3,977,471 | 8/1976 | Gale et al. | 252/8.55 D |
| 4,018,278 | 4/1977 | Shupe | 252/8.55 D |
| 4,192,382 | 3/1980 | Schievelbein | 166/269 |
| 4,222,957 | 9/1980 | Watts, Jr. et al. | 260/513 R |

FOREIGN PATENT DOCUMENTS 2610701 3/1976 Fed. Rep. of Germany ...... 252/353
0157282 12/1975 Japan .................................. 252/353

Primary Examiner—Herbert B. Guynn
Assistant Examiner—Howard J. Locker
Attorney, Agent, or Firm—Alexander J. McKillop; Michael G. Gilman; Charles J. Speciale

[57] ABSTRACT

This invention provides a blend of at least two homologous surfactants having the formula:

$$R-(OC_2H_4)_n-OCH_2CH_2CH_2SO_3Na$$

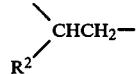

wherein R is $R^1$\
$\phantom{wherein R is R^1}$\CHCH_2—
$R^2$/ in which $R^1$ and $R^2$ are the same or different $C_4$–$C_{24}$ alkyl, the total number of carbon atoms in R is between 10 and 30, and n is between 2 and 6; the molar ratio of the homologs in the blend being between about 9:1 and 1:9.

6 Claims, 9 Drawing Figures

BLENDS OF SURFACTANT HOMOLOGUES ADJUSTED TO SALINITY DURING WATERFLOODING

BACKGROUND OF THE INVENTION

1. Field of the Invention

This invention is concerned with surfactant waterflooding in subterranean reservoirs.

2. Description of the Prior Art

In copending application Ser. No. 259,216, filed Apr. 30, 1981, there is disclosed a class of homologous sodium branched alkylpolyethyleneoxy propane sulfonates. The compounds differ from each other primarily in the size of the hydrophobe, i.e., the number of carbon atoms in the branched alkyl group. Each compound has a range of salinities in which it is effective, i.e., salinity window.

In formations having extremely low porosity, however, ultra low interfacial tensions are necessary, below about 10 millidynes (0.01 dyne) per centimeter. With this requirement, the effective salinity range of each surfactant described in Ser. No. 259,216 is relatively narrow. In order to provide ultra low interfacial tension for fields having salinities throughout the range of about 4–30% salinity, a plurality of surfactants would have to be available. It is the discovery of this invention that, by blending two or more homologs, a desired salinity window can be obtained with a small number of surfactants. Insofar as is now known, this has not been proposed.

SUMMARY OF THE INVENTION

This invention provides a blend of at least two homologous surfactants having the formula:

wherein R is

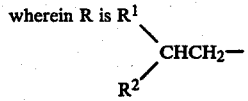

in which $R^1$ and $R^2$ are the same or different $C_4$–$C_{24}$ alkyl, the total number of carbon atoms in R is between 10 and 30, and n is between 2 and 6; the molar ratio of the homologs in the blend being between about 9:1 and about 1:9.

DESCRIPTION OF SPECIFIC EMBODIMENTS

The surfactants used in the blends of this invention have the formula:

wherein R is

in which $R^1$ and $R^2$ are the same or different $C_4$–$C_{24}$ alkyl, the total number of carbon atoms in R is between 10 and 30, and n is between 2 and 6. In preferred embodiments n is 3.

The blends contain two or more homologous surfactants blended in a molar ratio between about 9:1 and about 1:9. As will be apparent from the specific examples, the homologs in a blend are selected to give ultra low interfacial tensions of about 10 millidynes per centimeter or lower at the salinity of the reservoir in which it is to be used. The concentration of blend used to effect ultra low interfacial tension will be very low, generally between about 0.001 weight percent and about 1 weight percent.

Using the procedures described in Ser. No. 259,216, which is incorporated herein by reference, three surfactants were prepared. These surfactants have the following structures.

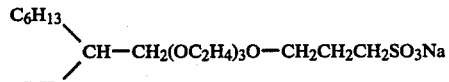

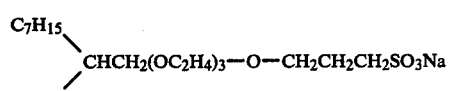

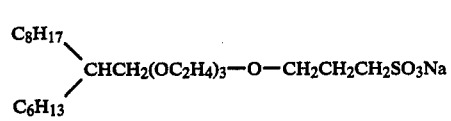

General Procedure

A series of brines were prepared each having a different percent salinity expressed as weight percent salts, in the ratio of 13.2 g. NaCl to 3.47 g. $CaCl_2 \cdot 2H_2O$ to 1.53 g. $MgCl_2 \cdot 6H_2O$. To each brine was added the appropriate concentration of surfactant or surfactant blend being tested. Interfacial tension was measured in the following manner:

A spinning drop Interfacial Tensiometer was used. Measurements against a crude oil were made after 30 minutes spinning at 10 or 14 msec., or longer, or until no more change in the drop took place. Then, the width of the drop was measured. Interfacial tension was calculated using the equation:

$$IFT = \frac{9.8696 \times 10^6 \times \Delta d \times \left[\frac{DM}{66.6}\right]}{P^2}$$

where
IFT = Interfacial Tension, dynes/cm.
Δd = difference in density between oil and brine
DM = diameter of oil drop
P = spinning speed, msec.

Figure 1:
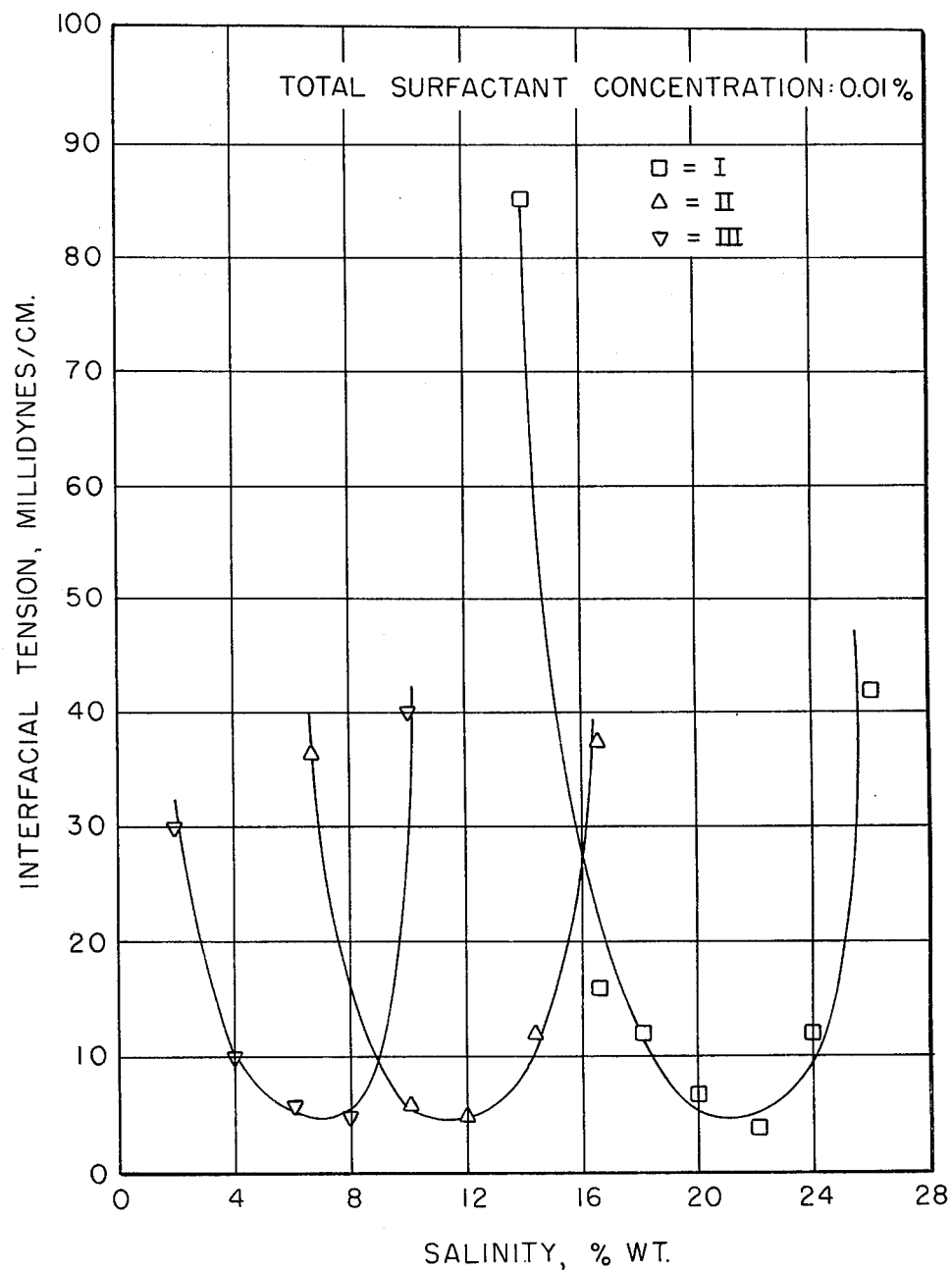
FIG. 1 presents curves showing the graphic relationship between interfacial tension and salinity for three individual surfactants (designated I, II, and III) at a concentration of 0.01%.

Each surfactant (I, II, or III) was blended with each brine at a concentration of 0.01 weight percent. Measurements were made on each blend. The results are plotted in FIG. 1, producing a curve showing the graphic relationship between interfacial tension in millidynes per centimeter and salinity.

Mobil's West Burkburnett is of extremely low permeability and has a salinity of 16.6%. From FIG. 1 it is evident that neither surfactant I or II show ultra low interfacial tension at 16.7% salinity. Thus, for this field an additional surfactant will be needed. Obviously, if this were done with other fields having other salinities, a plurality of surfactants would have to be inventoried.

EXAMPLE 1

Figure 2:
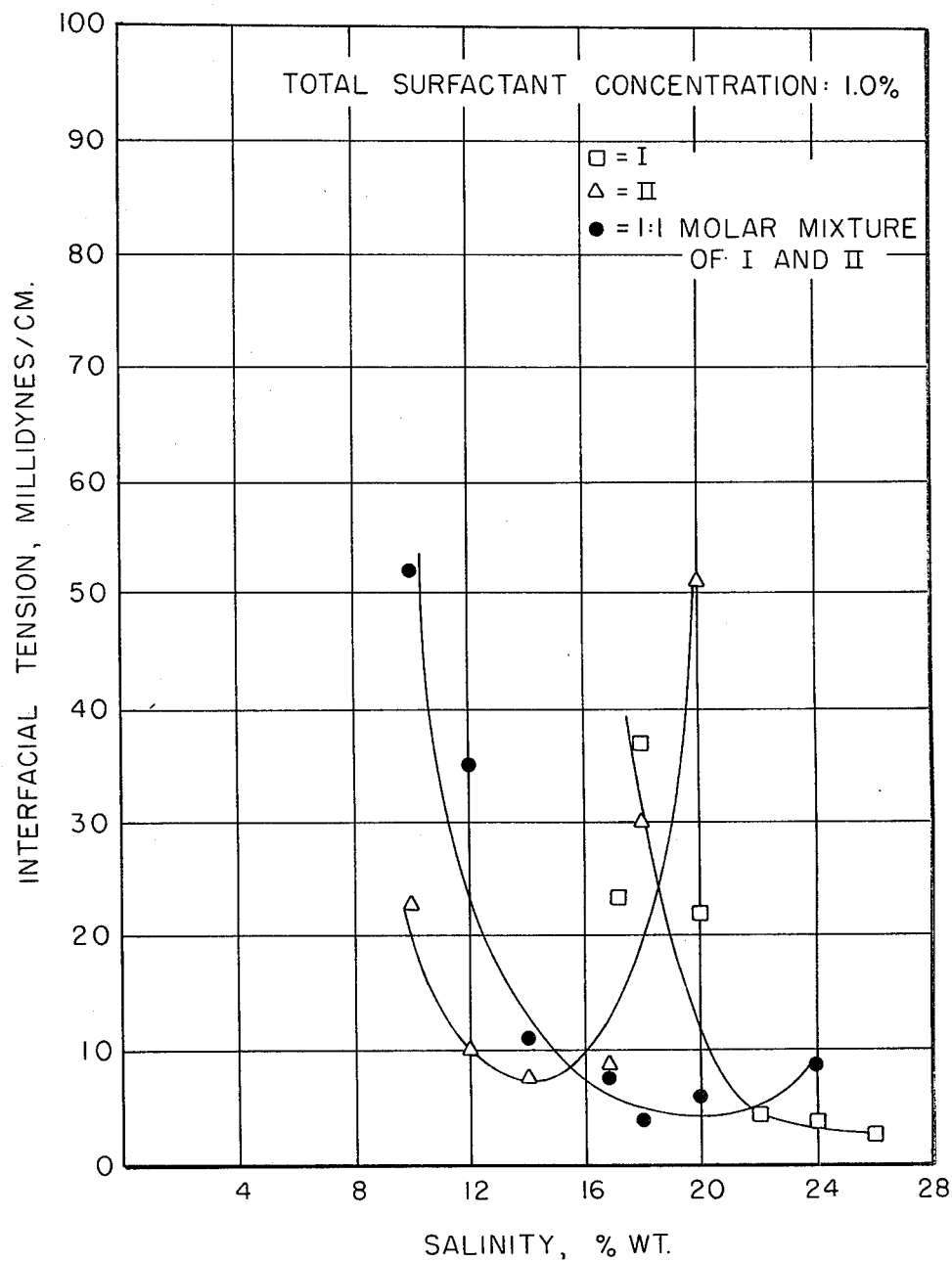
FIG. 2 presents curves showing the same relationship for two individual surfactants (designated I and II) and for a blend of them at a concentration of 1%.

A series of brine solutions were prepared each containing 1% of surfactant I and 1.032% of II or a 1:1 molar blend of I and II. Interfacial tension was measured for each solution and the results are plotted in FIG. 2.

It is seen that the ultra low interfacial tension of the blend falls between that of I alone and II alone. This blend would be usable in the West Burkburnett field without having to prepare another surfactant.

EXAMPLE 2

Figure 3:
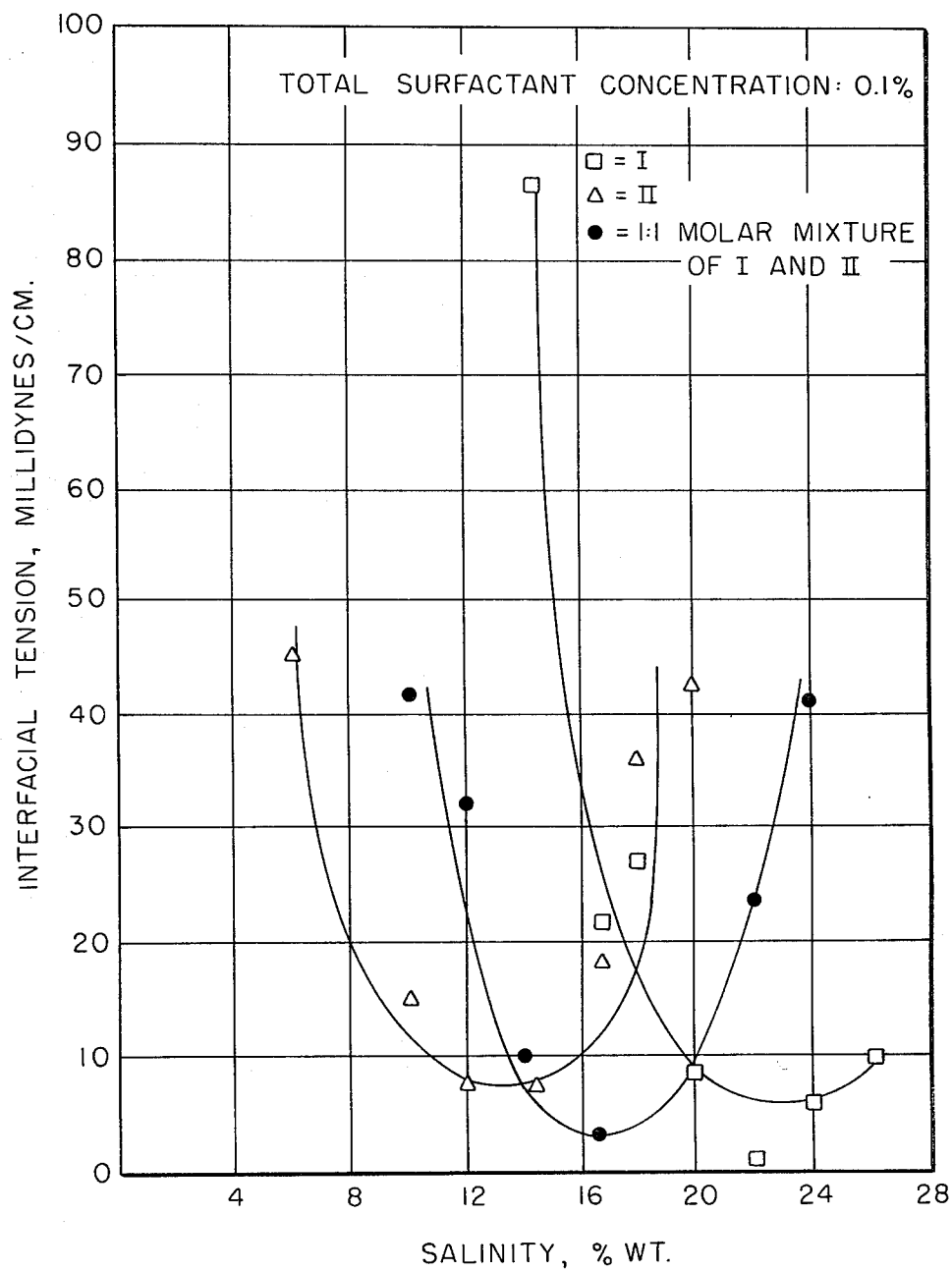
FIG. 3 presents curves showing the same relationship shown in FIG. 2 but at a concentration of 0.1%.

The concentrations of the surfactant solutions of Example 1 were diluted to a concentration of 0.1% with appropriate brine. Results of interfacial tension measurements are plotted in FIG. 3. Similar observations can be made as described for Example 1.

EXAMPLE 3

Figure 4:
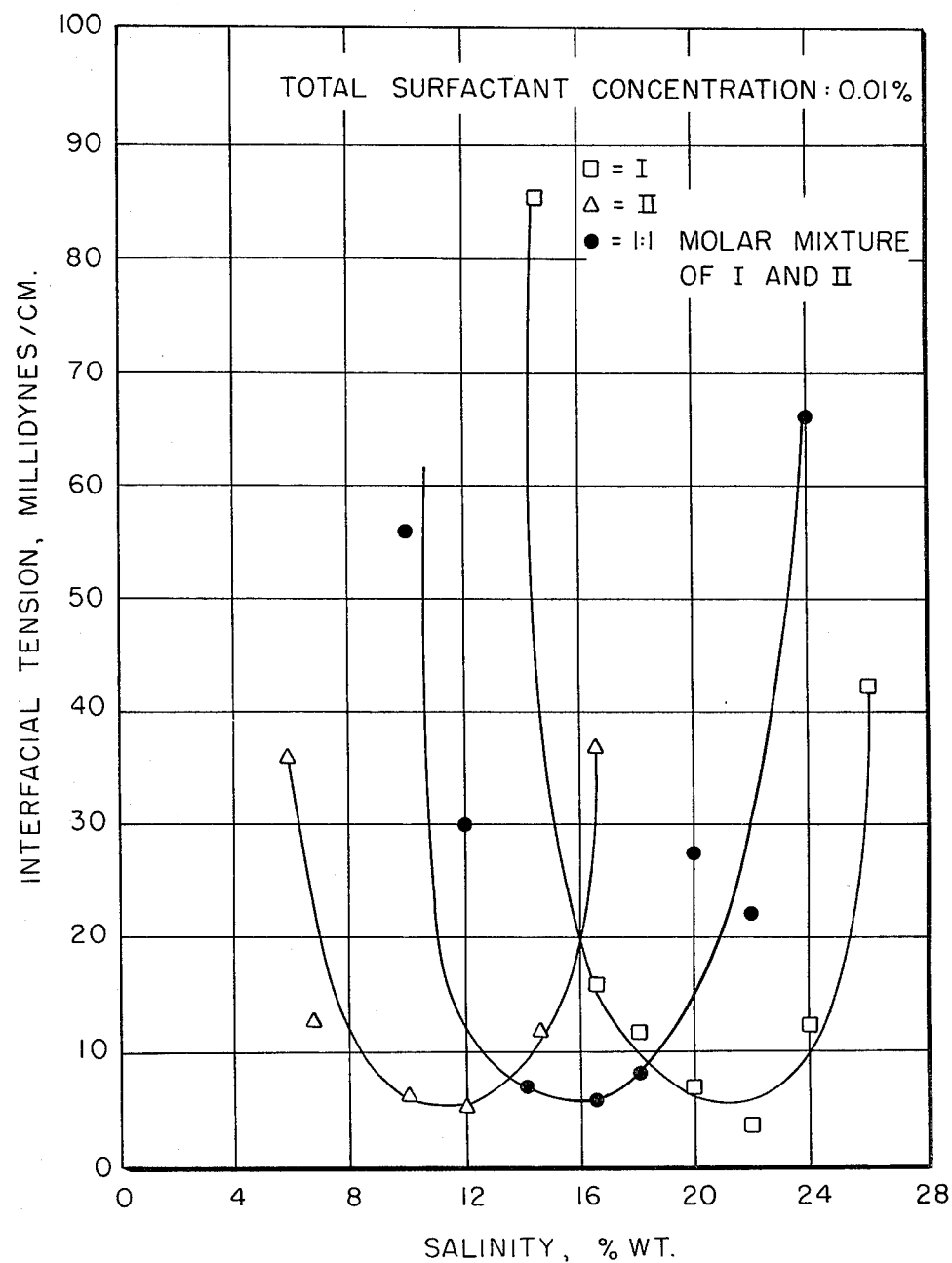
FIG. 4 presents curves showing the same relationship shown in FIG. 2 but at a concentration of 0.01%.

The concentration of the surfactant solutions was further reduced to 0.01% with appropriate brine. Results of interfacial tension measurements are plotted in FIG. 4. Similar observations can be made as described for Example 1.

EXAMPLE 4

Solutions in 16.6% brine containing blends of I and II in the mole ratio of I:II=3:1 and I:II'1:3, respectively, were prepared at various concentrations. Table I shows that these solutions produce ultra low interfacial tensions (IFT).

TABLE I

| Interfacial Tensions of 3:1 and 1:3 Molar Mixtures of I and II | | | |
|---|---|---|---|
| I:II = 3:1 | | I:II = 1:3 | |
| Total Concn., % | IFT, Dynes | Total Concn., % | IFT, Dynes |
| 2.0 | 0.0046 | 2.0 | 0.0033 |
| 1.33 | 0.010 | 1.33 | 0.0035 |
| 0.133 | 0.0054 | 0.133 | 0.0061 |
| 0.0133 | 0.0029 | 0.0133 | 0.0038 |

TABLE I-continued

| Interfacial Tensions of 3:1 and 1:3 Molar Mixtures of I and II | | | |
|---|---|---|---|
| I:II = 3:1 | | I:II = 1:3 | |
| Total Concn., % | IFT, Dynes | Total Concn., % | IFT, Dynes |
| 0.00133 | 0.0033 | 0.00133 | 0.0266 |

These results indicate that one can mix surfactants in unequal molar proportions to obtain outstanding performance.

EXAMPLE 5

Figure 5:
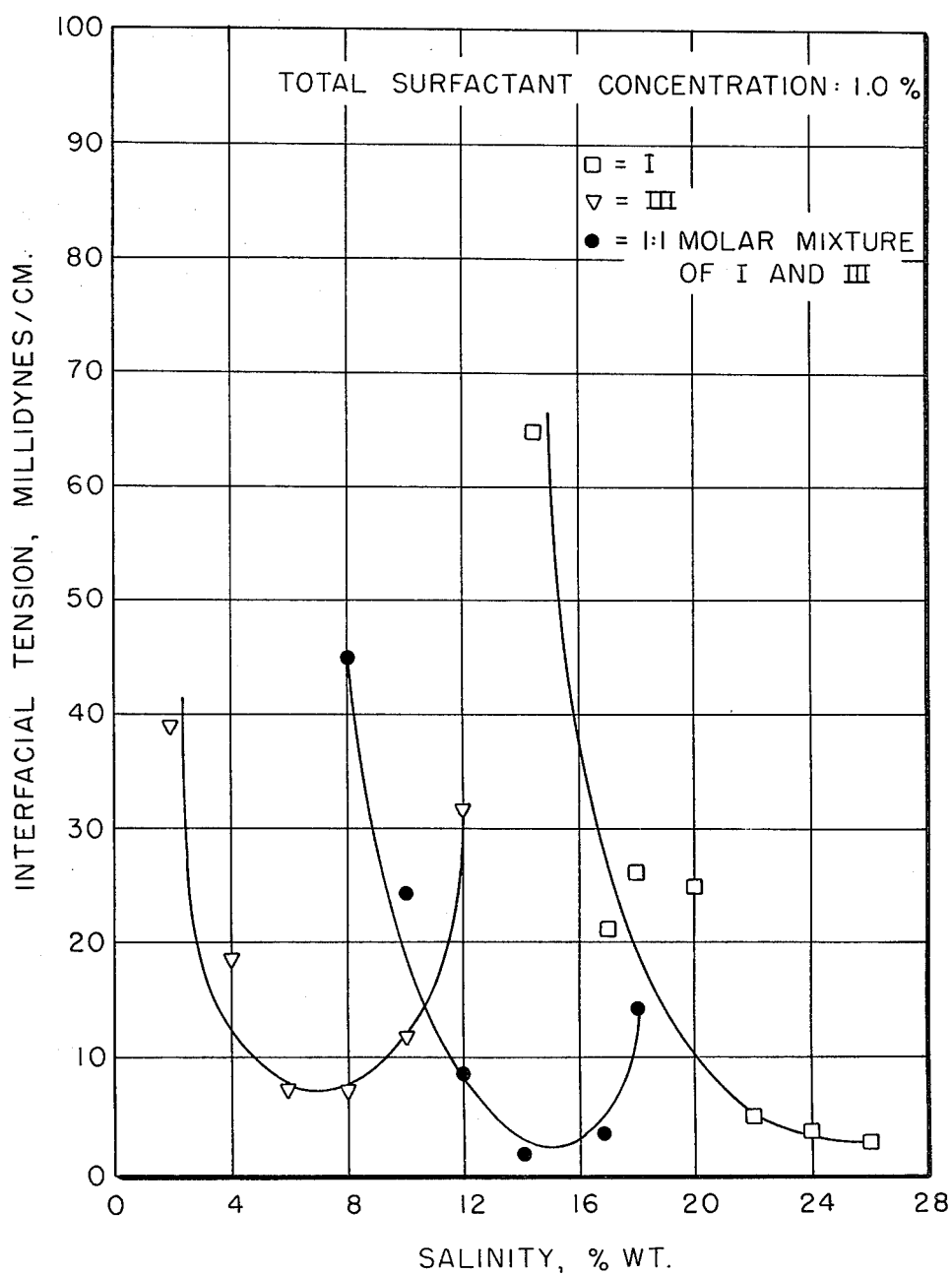
FIG. 5 presents curves showing the same relationship for two individual surfactants (designated I and III) and for a blend of them at a concentration of 1%.

One percent solutions containing equal molar blends of I and III and of I or III alone were prepared in different concentrations of the brine described in Example 1. FIG. 5 shows that the effective salinity window of the equal molar mixture, which has an average of 14 carbons in the hydrophobe, falls between the pure components, I and III which have 12 and 16 carbons in the hydrophobes, respectively. Again, the surfactant blend produces a wide salinity window as the pure components. Furthermore, the effective salinity range of the equal molar mixture of I and III almost exactly coincide with that of II, which has 14 carbons in its hydrophobe. The mixture produces even lower minimum interfacial tensions than II.

EXAMPLE 6

Figure 6:
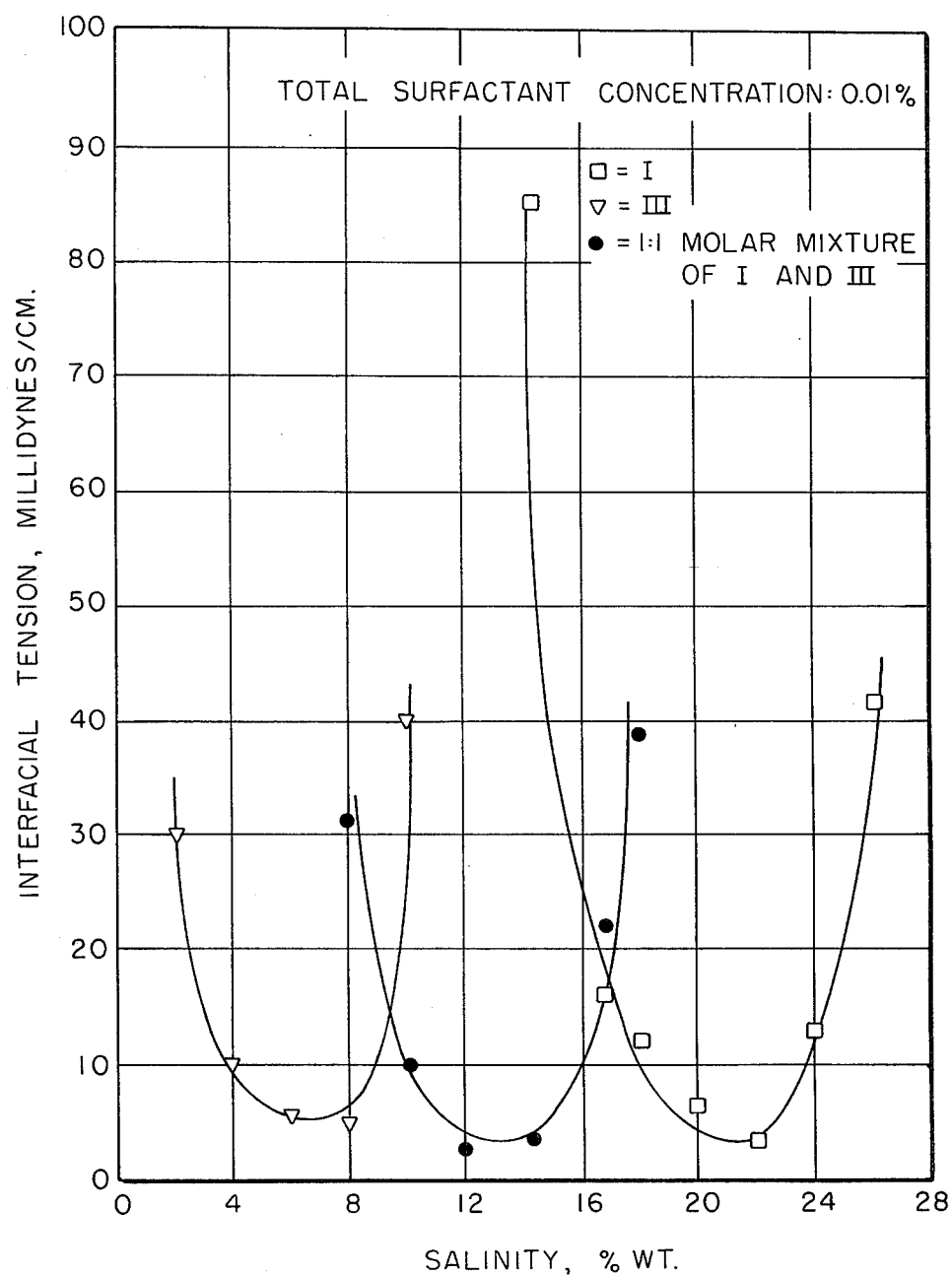
FIG. 6 presents curves showing the same relationship shown in FIG. 5 but at a concentration of 0.01%.

The solutions of Example 5 were diluted with appropriate brines to a concentration of 0.01%. Results of interfacial tension measurements are plotted in FIG. 6 and show results similar to those observed in Example 5.

EXAMPLE 7

Figure 7:
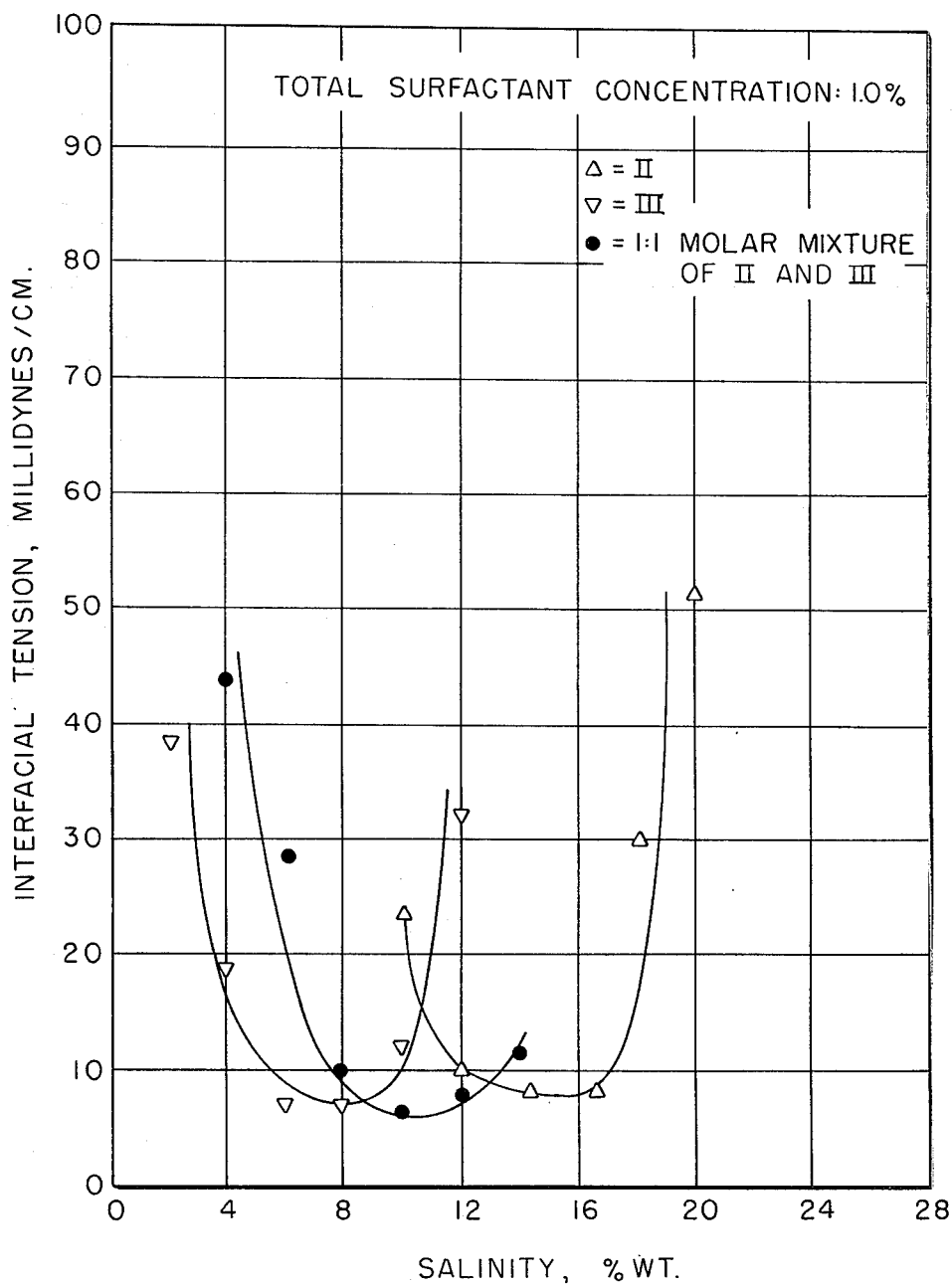
FIG. 7 presents curves showing the same relationship for two individual surfactants (designated II and III) and for a blend of them at a concentration of 1%.

One percent surfactant solutions, at various salinities, were prepared containing an equal molar blend of II and III, and of II or III alone. Interfacial tension results are plotted in FIG. 7. It is noted that ultra low interfacial tensions occur at salinities between about 8% and about 14%, between those of II of III alone. It is visualized that when the salinity of a reservoir falls between the salinity windows of II and III, a blend of II and III can be used for effective recovery of oil from such reservoir.

EXAMPLE 8

Figure 8:
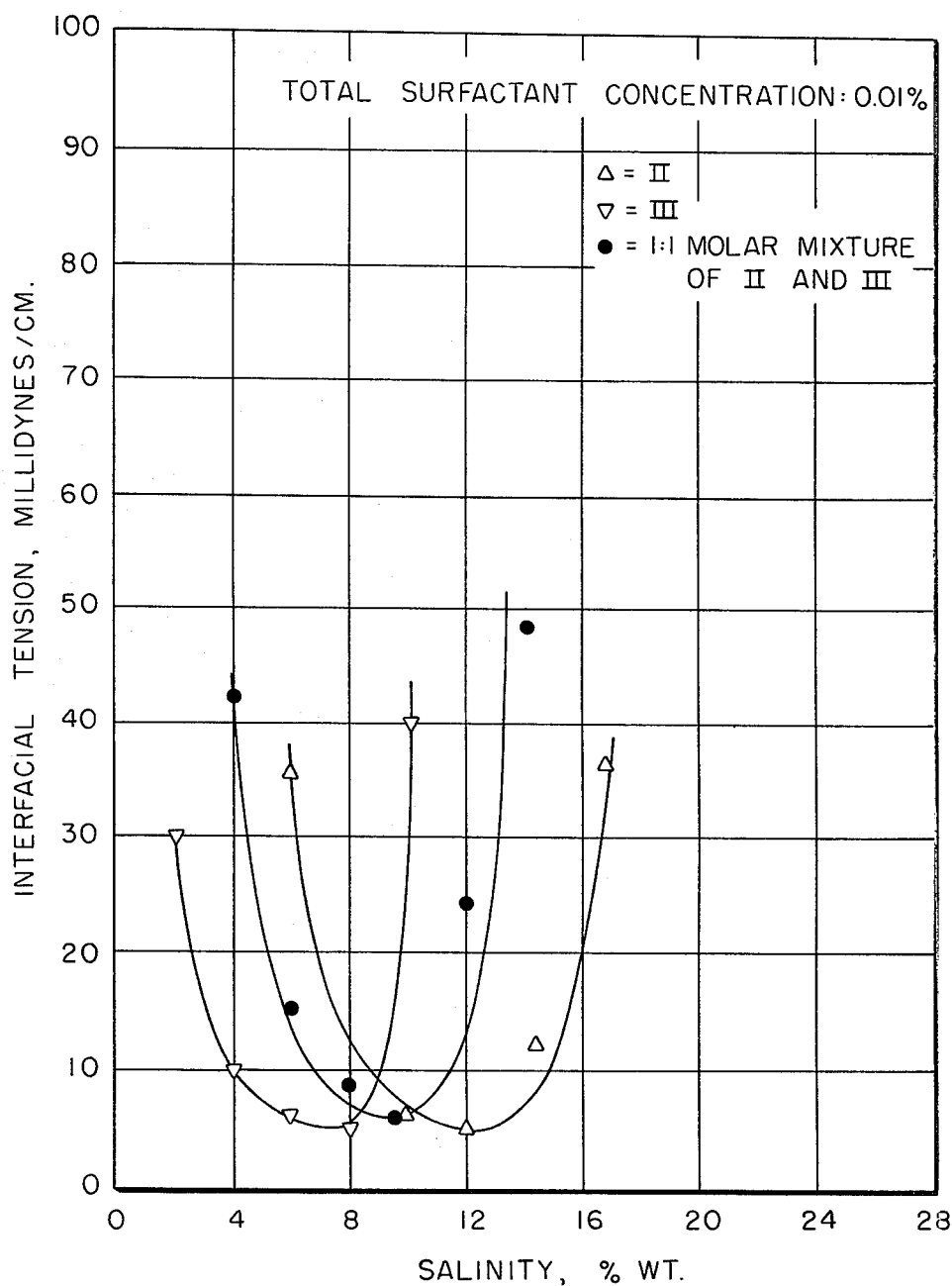
FIG. 8 presents curves showing the same relationship shown in FIG. 7 but at a concentration of 0.01%.

The concentration of the solutions of Example 7 was reduced to 0.01% with appropriate brine. Results of interfacial tension measurements are plotted in FIG. 8. Similar observations can be made as described for Example 7.

EXAMPLE 9

Figure 9:
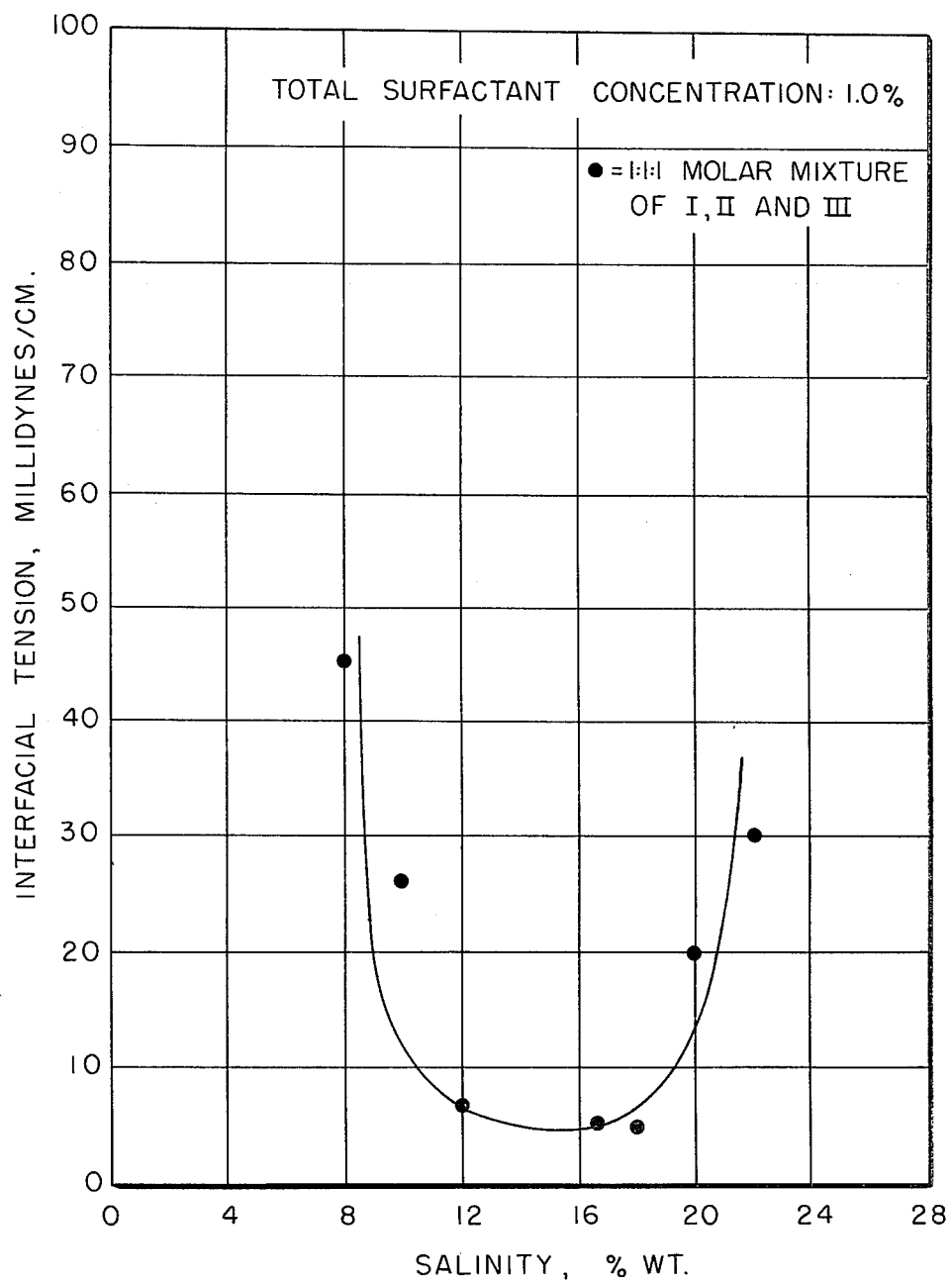
FIG. 9 presents a curve showing the same relationship for a blend of 3 surfactants (designated I, II, and III) at a concentration of 1%.

One percent brine solutions, at various salinities, were prepared of an equal molar blend of I, II, and III. Interfacial tension measurements are plotted in FIG. 9. It is noted that this ternary blend effects ultra low interfacial tension over a relatively wide range of salinities.

From the examples, it will be apparent that, with the surfactant blends of this invention, ultra low interfacial tensions can be obtained over a wide range of reservoir salinities with only a small number of surfactants. Since these surfactants are so chemically similar, the blends remain chromatographically "single component."

Although the present invention has been described with preferred embodiments, it is to be understood that modifications and variations may be resorted to, without departing from the spirit and scope of the invention, as those skilled in the art will readily understand. Such modifications and variations are considered to be within the purview and scope of the appended claims.

I claim:

1. A blend of at least two homologous surfactants having the formula:

$$R(OC_2H_4)_n\text{—}OCH_2CH_2CH_2SO_3Na$$

wherein R is a branched alkyl group of the formula the formula

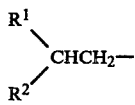

in which $R^1$ and $R^2$ are the same or different $C_4$-$C_8$ alkyl, the total number of carbon atoms in R is between 10 and 30, and n is between 2 and 6; the molar ratio of the homologs in the blend being between about 3:1 and about 1:3, and wherein said homologous surfactants have different numbers of carbon atoms in the branched alkyl groups thereof.

2. The blend of claim 1, wherein n is 3.

3. The blend of claim 2, wherein said blend contains surfactants having the formulae:

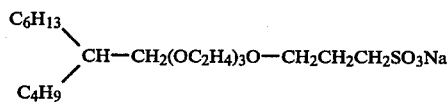

and

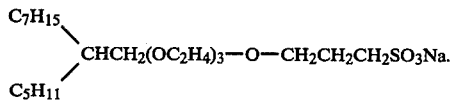

4. The blend of claim 2, wherein said blend contains surfactants having the formulae:

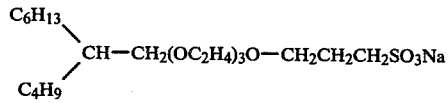

and

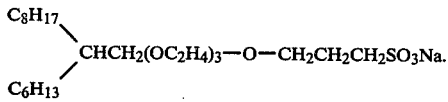

5. The blend of claim 2, wherein said blend contains surfactants having the formulae:

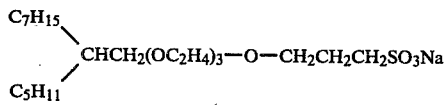

and

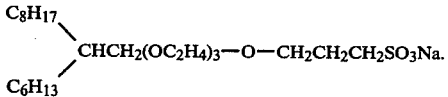

6. The blend of claim 2, wherein said blend contains surfactants having the formulae:

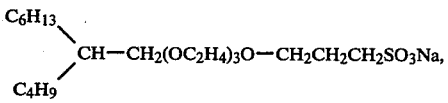

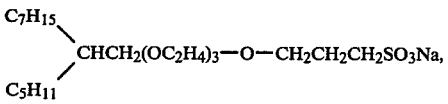

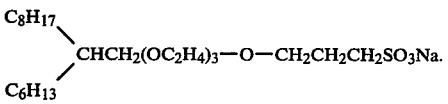

* * * * *